United States Patent
Cleave et al.

(10) Patent No.: US 6,644,158 B2
(45) Date of Patent: Nov. 11, 2003

(54) WORK TABLE

(75) Inventors: Jeffrey Van Cleave, Troy, MI (US); Eugene G. Eichhorn, Pinckney, MI (US); Matthew S. Damron, Ypsilanti, MI (US); Joseph W. Pawlow, Redford, MI (US)

(73) Assignee: Van Mark Products Corporation, Farmington Hills, MI (US)

( * ) Notice: Subject to any disclaimer, the term of this patent is extended or adjusted under 35 U.S.C. 154(b) by 20 days.

(21) Appl. No.: 10/001,378

(22) Filed: Oct. 19, 2001

(65) Prior Publication Data

US 2002/0056306 A1 May 16, 2002

Related U.S. Application Data

(60) Provisional application No. 60/241,611, filed on Oct. 19, 2000.

(51) Int. Cl.$^7$ ................................................ B26D 1/18
(52) U.S. Cl. ............................... 83/455; 83/34; 83/485; 83/614; 83/649
(58) Field of Search .......................... 83/614, 455, 34, 83/574, 745, 454, 485, 486, 649; 33/474, 475, 476, 477, 478, 479, 480, 481

(56) References Cited

U.S. PATENT DOCUMENTS

| | | | |
|---|---|---|---|
| 516,026 A | | 3/1894 | Seaver |
| 1,724,215 A | | 8/1929 | Moran |
| 1,975,857 A | | 10/1934 | McKenney |
| 2,002,348 A | * | 5/1935 | Louviaux ..................... 33/446 |
| 2,023,911 A | * | 12/1935 | Boughton .................... 83/455 |
| 2,624,408 A | | 1/1953 | Stein ............................ 83/485 |
| 3,821,915 A | * | 7/1974 | Larrable ....................... 83/174 |
| 4,415,149 A | | 11/1983 | Rees |
| 4,505,174 A | * | 3/1985 | Carithers, Jr. ................ 83/455 |
| 4,768,763 A | | 9/1988 | Gerber |
| 4,918,966 A | | 4/1990 | Raccioppi, Jr. |
| 4,957,024 A | | 9/1990 | Albrecht |
| 5,036,740 A | * | 8/1991 | Tsai ............................. 83/455 |
| 5,067,535 A | | 11/1991 | Wolff |
| 5,086,680 A | * | 2/1992 | Johnson ....................... 83/167 |
| 5,105,862 A | | 4/1992 | Skinner et al. |
| 5,107,736 A | | 4/1992 | Albrecht |
| 5,320,150 A | | 6/1994 | Everts et al. |
| 5,651,298 A | | 7/1997 | Break et al. |
| 5,671,647 A | * | 9/1997 | Mori ............................ 83/56 |
| 5,681,034 A | | 10/1997 | Noniewicz |
| 5,819,618 A | * | 10/1998 | Rodriguez .................... 83/56 |
| 5,845,554 A | * | 12/1998 | Kozyrski ..................... 83/455 |
| 5,927,436 A | | 7/1999 | Schutz |
| 6,050,168 A | | 4/2000 | Kuchta et al. |

FOREIGN PATENT DOCUMENTS

FR 2504429 A1 10/1982

OTHER PUBLICATIONS

Van Mark Advertisement for Coil Dispenser™, 2000 Month unknown.
J–Dan Advertisement for The Tradesmen®, Apr. 4, 2001.
Van Mark Products Corporation template having sheet metal bending guides Undated.
Van Mark Products Corporation ruler having sheet metal bending guides Undated.

* cited by examiner

*Primary Examiner*—Kenneth E. Peterson
(74) *Attorney, Agent, or Firm*—Brooks Kushman P.C.

(57) ABSTRACT

A work table having longitudinal and transverse cutter guide rails and a removable cutter. The cutter cooperates with linear knives on a longitudinal edge and on a lateral edge of the work table for making longitudinal and transverse cuts to form blanks from sheet stock. A roller knife on the cutter cooperates with linear knives on transverse and lateral edges of the work table to cut coil stock. The longitudinal cutter guide rail is provided with cam clamps that flex the beam to securely clamp sheet stock between the upper beam and the table top when longitudinal cuts are made. Grid lines and template instructions may be provided to assist workers in measuring and laying out blanks of sheet stock. Sheet stock may be supplied from a coil that is retained in a coil holder either on the work table or adjacent to the work table on a separate stand.

18 Claims, 7 Drawing Sheets

WORK TABLE

CROSS-REFERENCE TO RELATED APPLICATIONS

This application claims the benefit of U.S. Provisional Application Serial No. 60/241,611, filed on Oct. 19, 2000.

BACKGROUND OF THE INVENTION

1. Field of the Invention

The present invention relates to a work table having integral lateral and longitudinal cutting guides and a detachable cutter.

2. Background Art

Workers in the sheet metal fabricating trades cut panels and layout complex folded pieces on site. Vinyl sheet stock including pieces of vinyl and coils of vinyl are increasingly being used in place of sheet metal. References to sheet metal in this application should be deemed equally applicable to vinyl sheet stock. Sheet metal is used in making soffit, fascia, roof panels and aluminum siding trim. Sheet metal supplied in coil form is cut to the desired size and then marked to locate bends and folds in the part required to make J-channel shapes, brick molding, and the like. Workers generally layout these complex shapes on the ground, on make shift tables, or on top of a bending brake.

When working with elongated sheets of sheet metal that may be twelve feet in length it is difficult to precisely locate cuts and bends and it is difficult to make accurate cuts, particularly along the length of a long sheet metal piece. If inaccurate cuts or bends are made, scrap costs and material waste increase. Also, the quality of parts fabricated may be adversely impacted.

There is a need for a portable work table for use at job sites that facilitates cut off of blanks, layout and formation of complex sheet metal shapes. The present invention addresses this need and the above problems as summarized below.

SUMMARY OF THE INVENTION

According to one aspect of the present invention, a portable work table is provided for working on sheet metal. The portable work table includes a stand and a table top that is supported on the stand. The table top may be described as having front and rear longitudinally extending edges and first and second transversely extending edges. A transversely extending guide rail is secured near the first transversely extending edge of the table. The guide rail is shifted between the first position in which the guide rail is spaced above the piece of sheet metal to be fabricated and a second position in which the guide rail is held to clamp the sheet metal against the table. A backstop may be provided near the rear edge of the table. A removable cutter supported on the guide rail on bearings or other rolling elements and has a knife that is positioned to cut sheet metal supported on the table in alignment with the first transversely extending edge of the table.

According to another aspect of the invention a portable work table as described above may further feature a longitudinally extending guide rail secured near the front longitudinally extending edge of the table top. The longitudinally extending guide rail is moveable between a first position in which the guide rail is spaced above the sheet metal on the table and a second position in which the guide rail is held against the piece of sheet metal on the table. The removable cutter may be supported on either the longitudinally extending guide rail or the transversely extending guide rail to make transverse and longitudinal cuts in the sheet metal.

According to other aspects of the present invention another rail may be connected to the longitudinally extending guide rail at the opposite end from the transversely extending guide rail. The transversely extending guide rail, longitudinally extending guide rail and rail are connected together and are pivotally connected to the table at a point near or on the backstop to form a three-sided pivotal frame. The frame defines an open area on the table top for laying out and aligning the sheet metal piece.

Other aspects of another embodiment of the invention include securing the transversely and longitudinally extending guide rails to the table by means of a plurality of pins so that the guide rails are vertically moveable. At least one and preferably a plurality of springs may be used to bias the guide rails away from the table to provide clearance between the table and the guide rails. Clearance is provided to allow the sheet metal to pass beneath the guide rails on the table top. At least one clamp is provided to releasably lock the guide rails in their second position to clamp the sheet metal against the table.

Other aspects of the invention relating to removable cutter include providing a removable cutter that includes a carriage and a pair of roller cutter knives that are positioned to cut the sheet metal on the table as the cutter is moved along the transversely extending guide rail and/or the longitudinally extending guide rail. A removable cutter may alternatively comprise a carriage and a roller cutter knife that is positioned to cut sheet metal on the table as the cutter is moved along the transversely or longitudinally extending guide rails. The roller knife is held so that it engages a knife edge on either the first transverse extending edge of the table or on the longitudinally extending edge of the table top. Alternatively, a scoring knife could be used instead of a roller knife and should be deemed an equivalent.

Another aspect of the invention relates to the concept of providing a bending flange that may be secured to the longitudinally extending edge of the table by a hinge. The bending flange is raised to bend a portion of the sheet metal overhanging the longitudinally extending edge of the table.

Another aspect of the invention relates to providing a coil holder that is connected to the table outboard of the first transversely extending edge of the table from which a roll of sheet metal may be dispensed onto to the table through a space formed between the table and the first transversely extending guide rail. A length of sheet metal may be measured with reference to measurement indicia on the portable work table and cut off to form a desired length of sheet metal. Alternatively, the coil holder may be provided separate from the table and positioned outboard of the first transversely extending edge of the table. The sheet metal may be dispensed from the coil, measured and cut off on the table. Transverse measurement indicia are also provided on the table top to facilitate laying out a piece of sheet metal for subsequent cutting and bending operations. The backstop secured to or near the rear edge of the table top may be used to align and orient sheet metal on the table top.

According to another aspect of the invention, the pair of longitudinally extending beams may be provided to which the table top is secured. The beams are specialized extruded beams having an upper side including a raised longitudinally extending central portion that is flanked by one or two relatively lower shoulder portions. The front longitudinally extending edge of the table is received on one shoulder portion. A first knife edge may be secured to one of the shoulder portions with a second knife edge being secured between two shoulder portions of the two longitudinally extending beams so that the second knife edge is aligned with the first transversely extending edge of the table top. The beams may also include a rib to which the stand may be detachably secured.

According to the present invention, a work table is provided that features a table top having a longitudinally extending front side, a longitudinally extending back stop, and two laterally extending side edges. A first cutter guide is attached adjacent to the front side of the table top, and a second cutter guide is attached adjacent to one of the side edges. A detachable cutter is usable with one or both of the first and second guides.

According to another aspect of the invention, the table top may have gridlines painted or embossed thereon to assist in measuring and aligning work pieces on the table top. In addition, the table top may have quick reference templates or instructions for forming sheet metal shapes on the top surface of the table top, either with or without the gridlines.

According to another feature of the invention, the first guide attached to the front side of the table top is provided by a rail that extends parallel to a linear knife edge that extends substantially across the entire length of the front side. The rail providing the first guide is secured at its ends to the table and may have cam clamps inboard of the end attachments that flex the rail downwardly to clamp the material to be cut against the table. The second cutter guide is provided by a rail attached adjacent to one of the side edges and that is parallel to a second linear knife edge that extends across one of the side edges of the table top.

The cutter of the present invention has a set of rail engaging rollers that engage the first and/or second cutter guides. The cutter also preferably includes a circular knife that cuts sheet material when the cutter is moved along the first or second cutter guide and engages one of the linear knife edges.

The present invention also may encompass providing a coil holder, that is retained either adjacent to a side edge of the table top, supported on extended rails adjacent the table top, or suspended from the bottom of the table top so that sheet material may be fed from the coil over one of the side edges to the upper surface of the table top.

The above objects and advantages and other features of the invention will be apparent to one of ordinary skill in the art in view of the attached drawings and description of the best mode below.

DETAILED DESCRIPTION OF THE PREFERRED EMBODIMENTS

Figure 1:
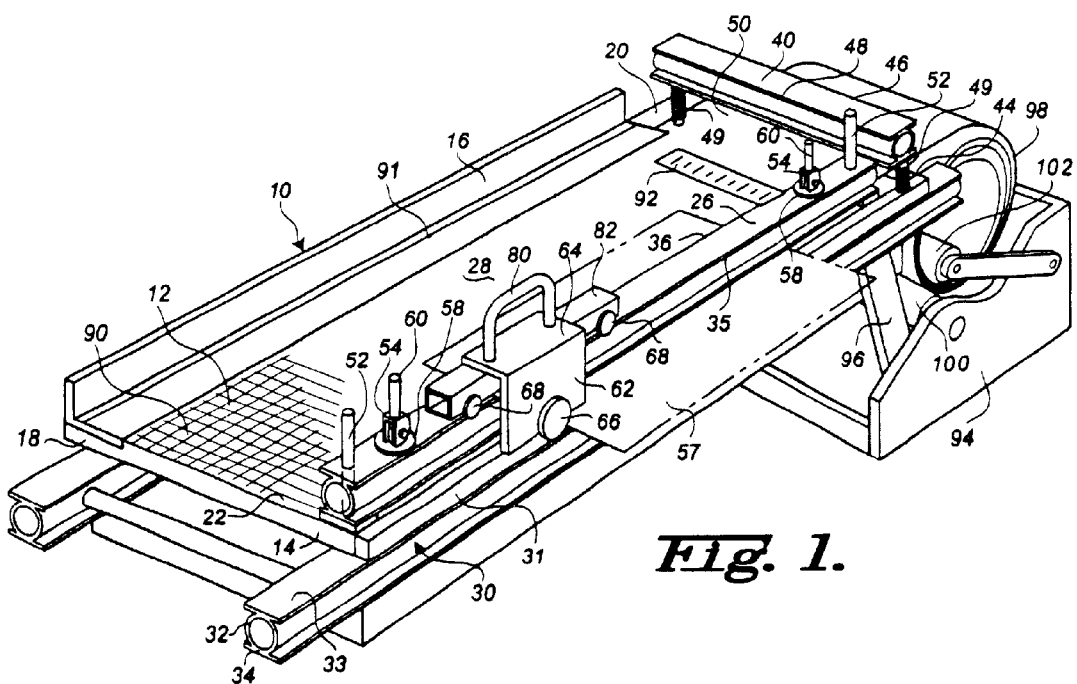
FIG. 1 is a front perspective view of the work table of the present invention.

Referring now to FIG. 1, a work table is generally indicated by reference numeral 10. The work table 10 includes a table top 12 having a front side 14 extending in a longitudinal direction. A back stop 16 is provided at a rear edge 18 of the table top 12. Right and left sides 20 and 22 extend transversely at opposite ends of the table top 12.

An upper beam 26 spans an upper surface 28 near the front side 14 of the table top 12. A lower beam 30 is secured to the table top 12 near the front side 14. A linear knife blade 31 is connected to the front side 14 of the table top 12 and is also preferably supported on the lower beam 30. The upper and lower beams 26 and 30 may be I beams or may be formed as an extruded member having a tubular portion 32, an upper plate 33, and a lower plate 34. Front and rear guide tracks 35 and 36 are formed on the upper beam 26.

As shown in FIG. 1, an upper transverse beam 40 is secured to the right side 20 of the work table 10. A transverse linear knife blade 44 is secured to the right side 20 of the table top 12. First and second guide tracks 46 and 48 are defined by the upper transverse beam 40. Upper transverse beam 40 is supported on springs 49 to provide a clearance space 50 between upper transverse beam 40 and the upper surface 28 of the table top 12 to permit sheet stock to be fed therethrough. Upper transverse beam 40 may be similar in structure to upper beam 26.

Figure 3:
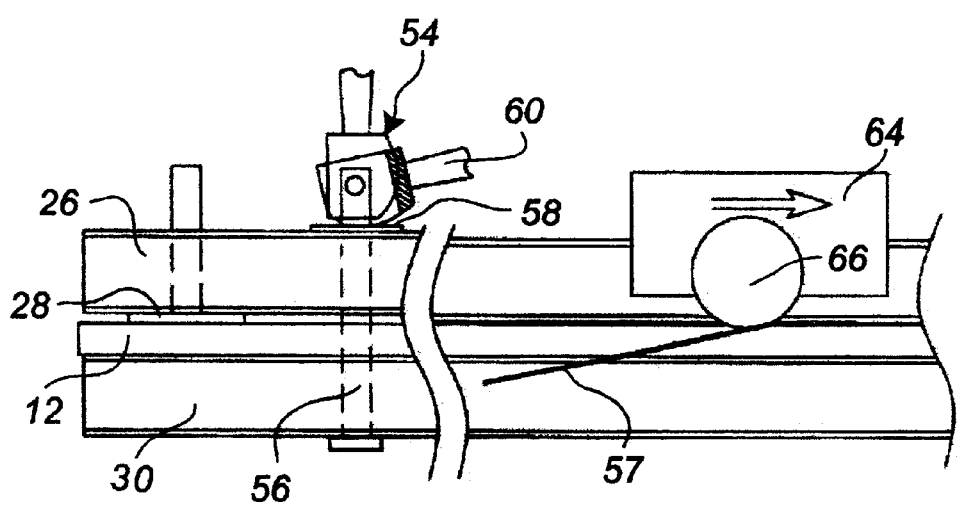
FIG. 3 is a fragmentary front elevation view, partially in cross-section, of the work table of the present invention.

Referring now to FIGS. 1 and 3, upper beam 26 is secured to the table top 12 by means of an end anchor 52 that secures the upper beam 26 to the table top 12. A cam clamp 54 is provided near the ends of the upper beam 26 but spaced from the end anchors 52. Cam clamp 54 is secured to an eye bolt 56 that extends through the lower beam 30. The cam clamp flexes the upper beam 26 downwardly toward the upper surface 28 of the table top 12 to thereby exert a clamping force on sheet stock 57 to be cut. A washer 58 is provided on the eye bolt 56 against which the cam clamp 54 may exert pressure on while protecting the upper beam 26. The cam clamp 54 has a lever 60 that may be grasped to engage and disengage the cam clamp 54.

Figure 2:
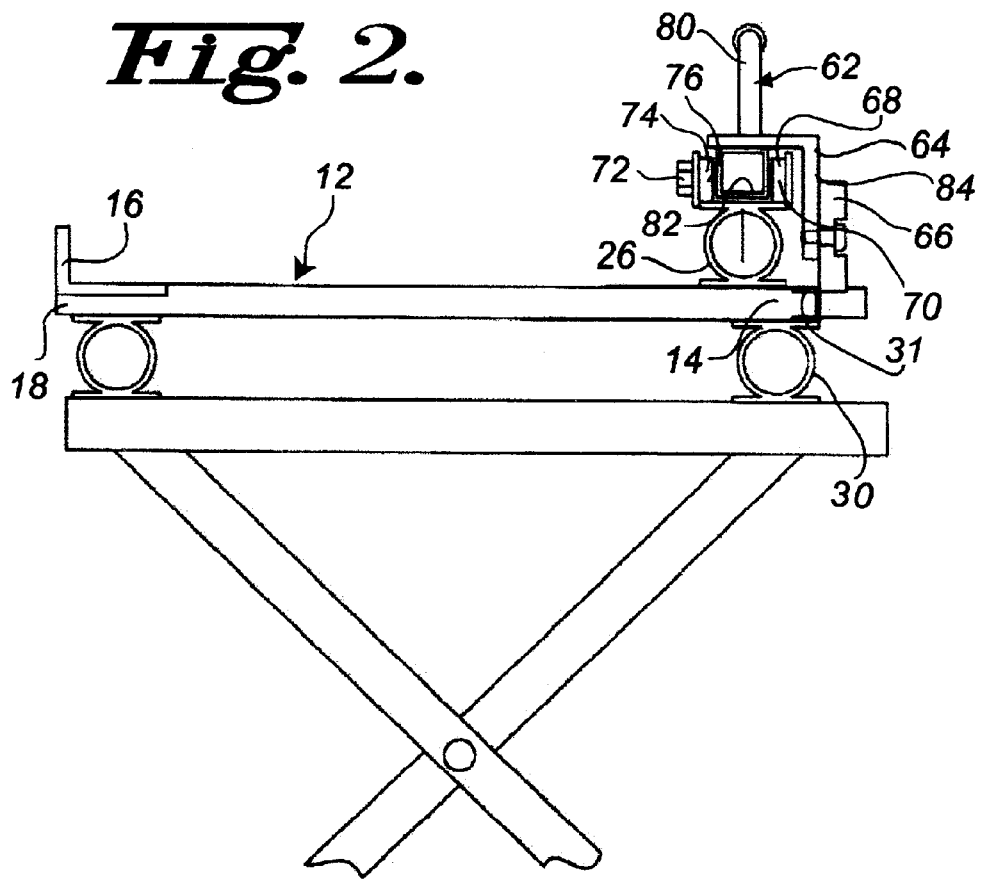
FIG. 2 is a fragmentary side elevation view of the work table of the present invention.

Referring now to FIGS. 1 and 2, a removable cutter 62 is provided to cut materials supported by the table top 12 that extend beyond the front side 14 or right side 20 of the table top 12. A non-removable cutter could be provided on the upper beam 26 with another cutter being provided on the upper transverse beam 40. However, by using a detachable cutter 62 a single cutter may be employed to make both longitudinal and transverse cuts.

The roller cutter 62 includes a cutter body 64 that supports a roller knife 66 for rotational engagement with either the linear knife blade 31 or the transverse linear knife blade 44. The cutter body 64 supports front rollers 68 on bearings 70 that are secured to the cutter body by means of a fastener 72. Rear rollers 74 are supported by bearings 76 and secured to the cutter body 64 by means of fasteners 72. A handle 80 is provided on the cutter body 64.

The cutter body 64 is preferably formed in two parts comprising a lower support 82 and an upper support 84 that are secured together. Shims may be provided between the upper and lower supports 84, 82 to adjust the height at which the roller knife 66 overlaps either the linear knife blade 31 or the transverse linear knife blade 44.

The table top 12 is preferably provided with grid lines 90 on its upper surface 28 that can be used to measure the length and width of blanks that are to be cut by the cutter 62. Instead of grid lines, measuring scales 91 may be provided adjacent the sides 20, 22 and rear edge 18 for measuring blanks to be cut on the work table. Upper surface 28 may also include quick reference templates 92 and written instructions for workers to refer to as they lay out blanks for subsequent folding on a bending brake. The templates 92 may be provided in the form of a decal applied to the surface 28.

The work table 10 may include a built-in coil holder 94. Alternatively, coil holder 94 may be placed adjacent the work table 10 on a separate stand. Coil holder 94 may be supported, as illustrated, by a coil holder support frame 96 that is connected to the lower surface of the table top 12. Coil holder 94 supports a coil of sheet stock 98. The coil of sheet stock may be vinyl, aluminum, steel, coated aluminum, or galvanized steel. The coil 98 is supported on coil support rollers 100. The coil 98 is fed through a coil feed roller 102 to be dispensed from the coil holder 94 and supplied to the work table 10.

Figure 4:
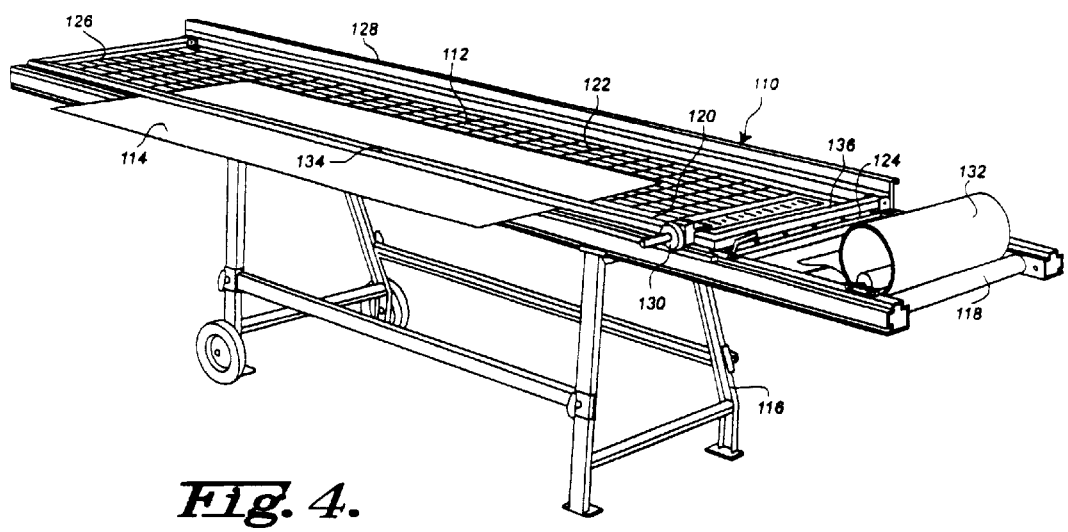
FIG. 4 is front perspective view of a work table made in accordance with an alternative embodiment of the present invention.

Referring now to FIG. 4, an alternative embodiment of a work table made in accordance with the present invention is generally indicated by reference numeral 110. The work table includes a table top 112 on which a piece of sheet metal 114 is supported for lay out and trimming. The work table includes a stand 116 that supports the work table 110 at a convenient height. At one end of the work table 110 a coil holder 118 is provided for dispensing sheet metal from a coil. The table top 112 includes a front edge 120, rear edge 122, right side edge 124 and left side edge 126. A back stop 128 is secured to the rear edge 122 of the table 110. The back stop 128 is used to square-up a piece of sheet metal 114 quickly and easily as for lay out on the table top 112.

Also shown in FIG. 4 is a single knife roller cutter that includes a single roller cutter blade that is used to cut the sheet metal 114 on the table top 112. A roll of sheet metal 132 is fed onto the table top 112 and is then cut off by the roller cutter 130. The roller cutter 130 is adapted to ride on either a longitudinal guide rail 134 or transverse guide rail 136 as it cuts. The longitudinal guide rail 134 and transverse guide rail 136 are clamped securely to the table top 112 when the sheet metal 114 is cut as will be described in greater detail below. It is necessary to secure the sheet metal 114 in place as it is cut so that a straight cut is made in the rigid sheet metal. It should be noted that the references to sheet metal are equally applicable to vinyl.

Figure 5:
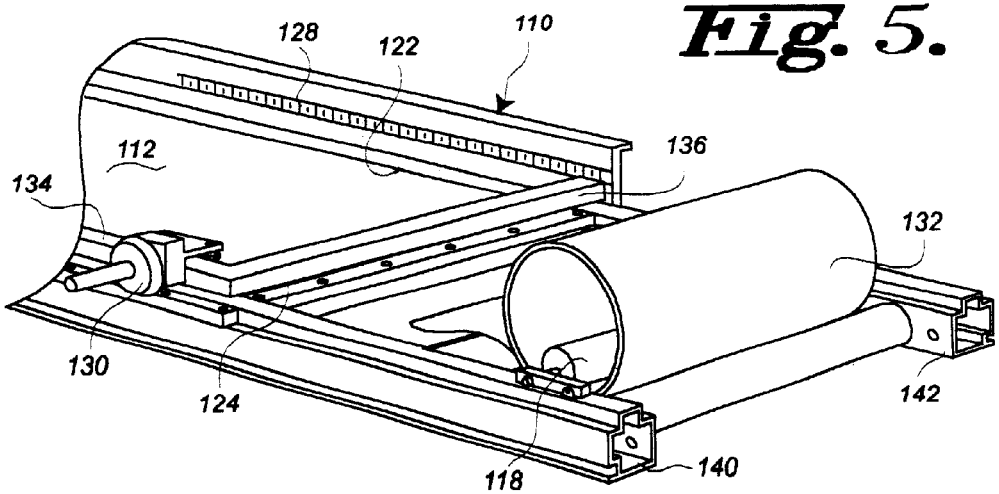
FIG. 5 is a fragmentary front perspective view of the work table as shown in FIG. 4 with a coil holder attached thereto.
Figure 6:
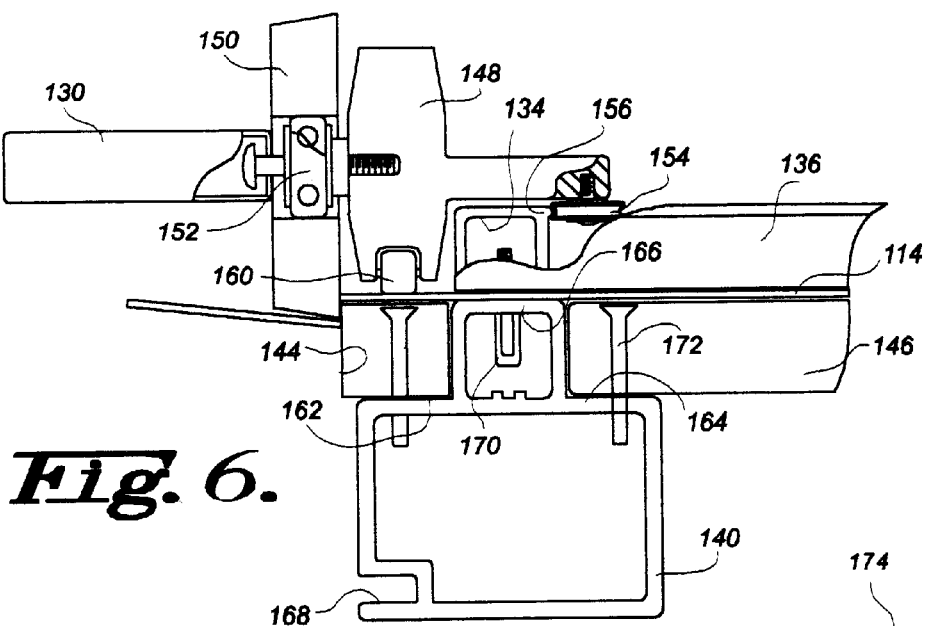
FIG. 6 is a fragmentary diagrammatic end view of a work table and roller cutter as shown in FIG. 4.
Figure 7:
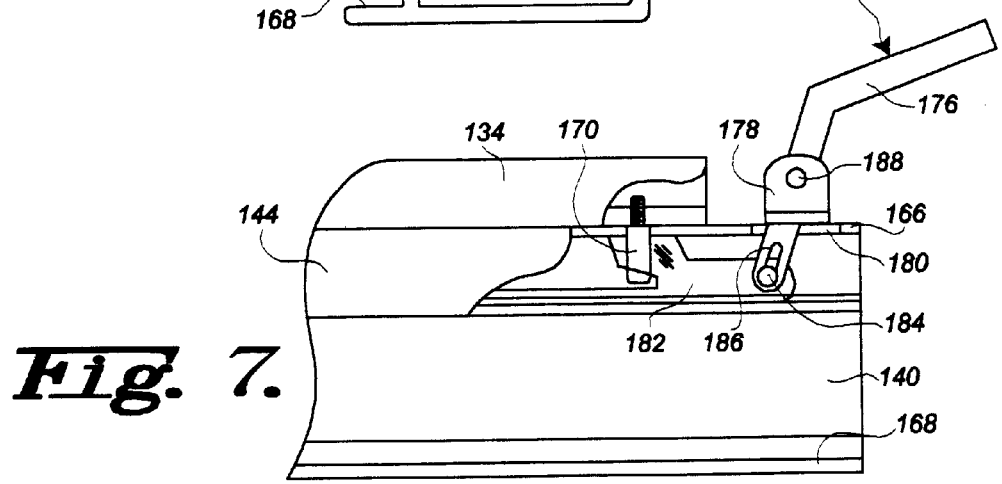
FIG. 7 is a fragmentary front elevation view of a clamp for the work table shown in FIG. 4.

Referring now to FIGS. 5 through 7, the work table 110 is shown in greater detail. The work table 110 is shown with the roll of sheet metal 132 being fed toward the table top 112. The longitudinal guide rail 134 and transverse guide rail 136 are shown in their lowered position. Normally, when the sheet metal is fed onto the table top 112, the guide rails 134 and 136 are raised to facilitate feeding the sheet metal.

A front longitudinal beam 140 and rear longitudinal beam 142 support the front edge 120 and rear edge 122 of the table top 112. The front and rear longitudinal beams 140, 142 extend outwardly from the right side edge 124 so that the coil 132 may be held in a position that does not interfere with work to be performed on the table top 112. Front and rear longitudinal beams 140, 142 are extruded beams that will be more specifically described below in reference to FIG. 6.

Referring now to FIG. 6, the table 110 is shown with a single knife roller cutter 130. The roller cutter 130 cooperates with longitudinal knife edge 144 to make longitudinal cuts and transverse knife edge 146 to make transverse cuts with the roller cutter 130. The roller cutter includes a carriage 148 to which a rotatable knife 150 is rotatably secured by means of bearing assembly 152. The carriage 148 includes a concave roller 154 that engages a track 156 on the longitudinal guide rail 134. A surface roller 160 is also secured to the carriage 148 and is adapted to roll on the surface of the sheet metal 114 that is clamped between the longitudinal and transverse guide rails 134, 136 as the roller cutter 130 cuts the sheet metal 114.

A front longitudinal beam 140 is shown in FIG. 6 to include a outer shoulder 162 and an inner shoulder 164 on opposite sides of a raised portion 166. The outer shoulder 162, inner shoulder 164 and raised portion 166 together form the upper portion of the front longitudinal beam 140. The beam 140 also includes a stand bracket rib 168 that may be engaged by brackets provided on the stand 116 as is more fully described in co-pending application Ser. No. 09/952,917, filed Sep. 14, 2001, the disclosure of which is hereby incorporated by reference. A clamp receptacle loop 170 is carried by the longitudinal guide rail 134 and is inserted into the beam 140 when the guide rails 134, 136 are placed in their closed or clamping position. The knife edges 144 and 146 are secured to the shoulders 162, 164, respectively, by means of fasteners 172. The clamp receptacle loop 170 is received in the raised portion 166 of the beam 140.

Referring now to FIG. 7, the clamp assembly 174 that engages the clamp receptacle loop 170 is described. The clamp assembly 174 includes a handle 176 and a clevis bracket 178 that pivotally mounts the handle 176 to the raised portion 166 of the beam 140. The handle extends through a slot 180 in the top surface of the raised portion 166. A slide cam lock 182 is disposed within the opening defined by the raised portion 166 of the beam 140 and is moved longitudinally by the handle 176 of the clamp assembly 174. The slide cam lock 182 engages the clamp receptacle loop 170 and draws the longitudinal guide rail 134 downwardly as it is shifted to the left as shown in FIG. 7. A pin 184 extends through a slot 186 in the handle 176 and secures the handle 176 to the slide cam lock 182. The handle is mounted in the clevis bracket 178 by means of a pivot pin 188. To release the longitudinal guide rail 134, the handle is rotated counterclockwise, thereby shifting the slide cam lock 182 to the right and into a disengaged position.

Figure 8:
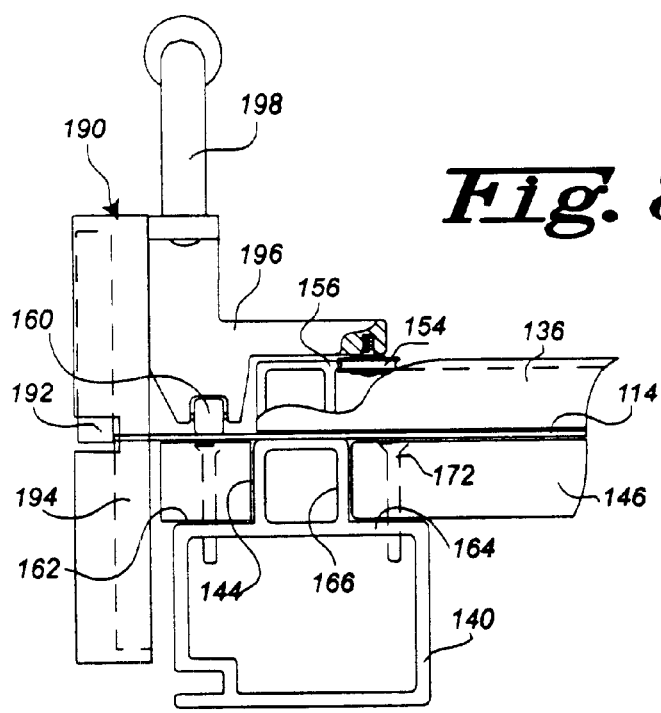
FIG. 8 is a fragmentary diagrammatic side elevation view of a work table as shown in FIG. 4 with an alternative embodiment of a roller cutter secured thereto.

Referring now to FIG. 8, a dual knife roller cutter 190 is shown to include an upper knife 192 and a lower knife 194 that are mounted on a carriage 196. The carriage 196 includes a handle that is grasped by an operator to move the carriage 196 along the guide rails 134, 136. The carriage includes a concave roller 154 and a track 156, as well as a surface roller 160. The rollers 154, 160 are similar to the rollers previously described with reference to the single knife roller cutter 130. The longitudinal and transverse knife edges 140 and 146, while shown in FIG. 8, could be eliminated if desired or replaced by less costly steel reinforcement bars. The guide rails or reinforcement bars 144, 146 are received on the shoulder 162, 164 of the beam 140 by means of fasteners 172 as previously described.

Figure 9:
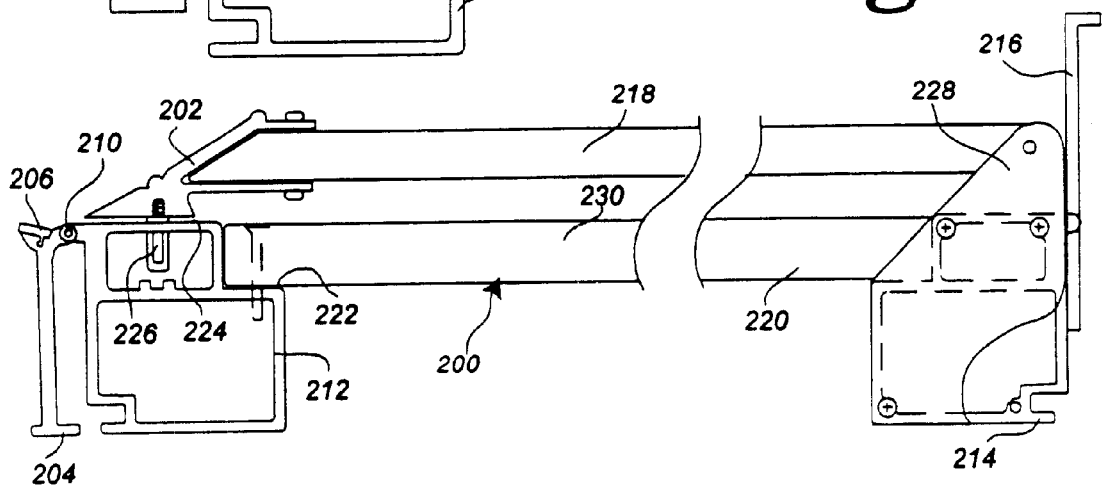
FIG. 9 is a fragmentary side elevation view of a work table including a bending flange made in accordance with an alternative embodiment of a work table of the present invention.

Referring now to FIG. 9, an alternative embodiment of a work table 200 is shown wherein an angled face clamp 202, also known as an F-flange, is provided in conjunction with a bending flange 204 that has a bending face 206. The bending flange 204 is pivotally raised on a hinge 210 to bend a piece of sheet metal that is clamped by the angled face clamp 202. Front beam 212 and rear beam 214 are used to support the work table 200. A back stop 216 is secured to the table and/or rear beam 214. A clamp rail 218 connects the angled face clamp 212 to the work table 200. A knife edge 220 is provided to extend transversely on one side of the work table 200. The knife edge 220 may be used with a single knife roller cutter 130 as previously described. A single shoulder 222 is provided on each of the front and rear beams 212, 214. The knife edge 220 is received on the shoulders 222. The raised portion 224 of the beams 212, 214 provide a table height surface. The raised portion 224 of the front beam 212 support sheet metal (not shown) that is clamped in place by means of angled face clamp 202. A clamping loop 226 is received within the raised portion 224 and is clamped in place by means of a locking element, for example, the clamp assembly 174 described in reference to FIG. 7. Other clamping constructions could also be utilized.

A reinforcing plate 228 is provided to reinforce the work table 200 and may also provide a surface to which the clamp rail 218 may be pivotally mounted.

Figure 10:
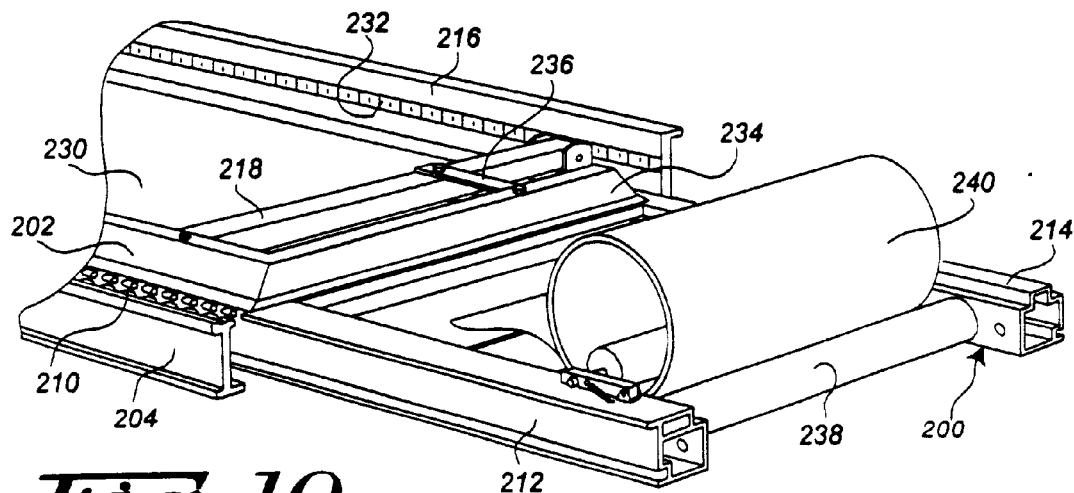
FIG. 10 is a fragmentary front perspective view of a work table having a bending flange and coil holder.

Referring now to FIG. 10, a table top 230 on which sheet metal is received is shown. When sheet metal is placed on the table top 230, longitudinal measuring indicia 232 located on the back stop 216 may be used to measure the sheet metal as it is dispensed. The brace shown in FIG. 10 also includes a side angled face clamp 234 that may be held against the sheet metal and is reinforced by a brace 236. A coil holder 238 supports a coil of sheet metal 240 that may be dispensed to the table top 230 and is fed beneath the side angled face clamp 234.

Figure 11:
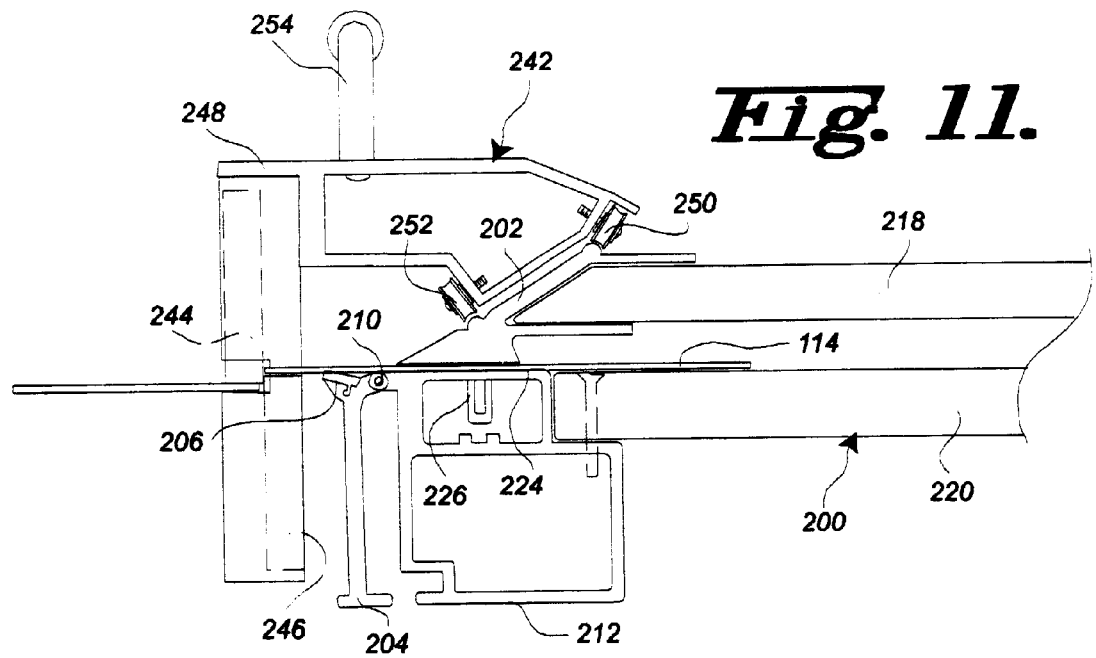
FIG. 11 is a fragmentary side elevation view of a work table as shown in FIG. 9 with a roller cutter.

Referring now to FIG. 11, another embodiment of a dual knife roller cutter 242 is shown in conjunction with the work table 200. The dual knife roller cutter 242 includes an upper knife 244 and a lower knife 246 that are supported on a carriage 248. A first concave roller 250 rolls on a rib formed on the angled face clamp 202. A second concave roller 252 is also disposed to ride upon a ridge formed on the angled face clamp 202. The dual knife roller cutter 242 includes a handle 254 that is used to manipulate the roller cutter 242.

Figure 12:
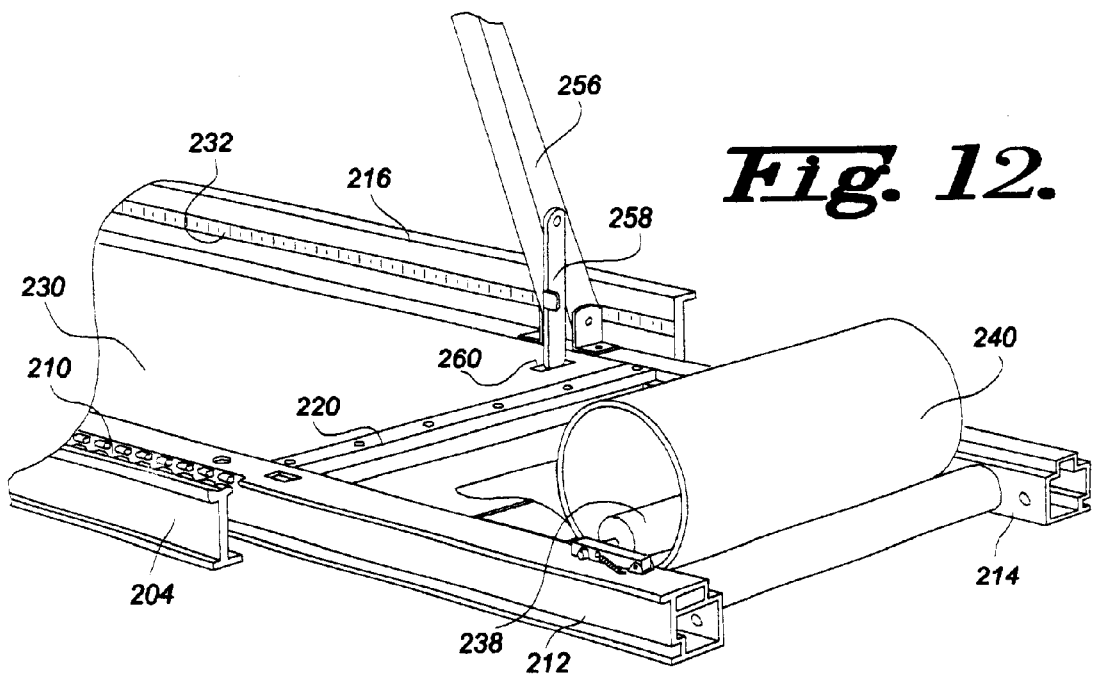
FIG. 12 is a fragmentary front perspective view of an alternative embodiment of a work table and coil holder.

Referring now to FIG. 12, a different type of clamp rail 256 is shown that includes a prop that extends through a slot 260 in the table top 230. The prop 258 holds the clamp rail 256 in a raised position and may be moved out of the way to permit the clamp rail 256 to be moved to its closed or clamping position.

Figure 13:
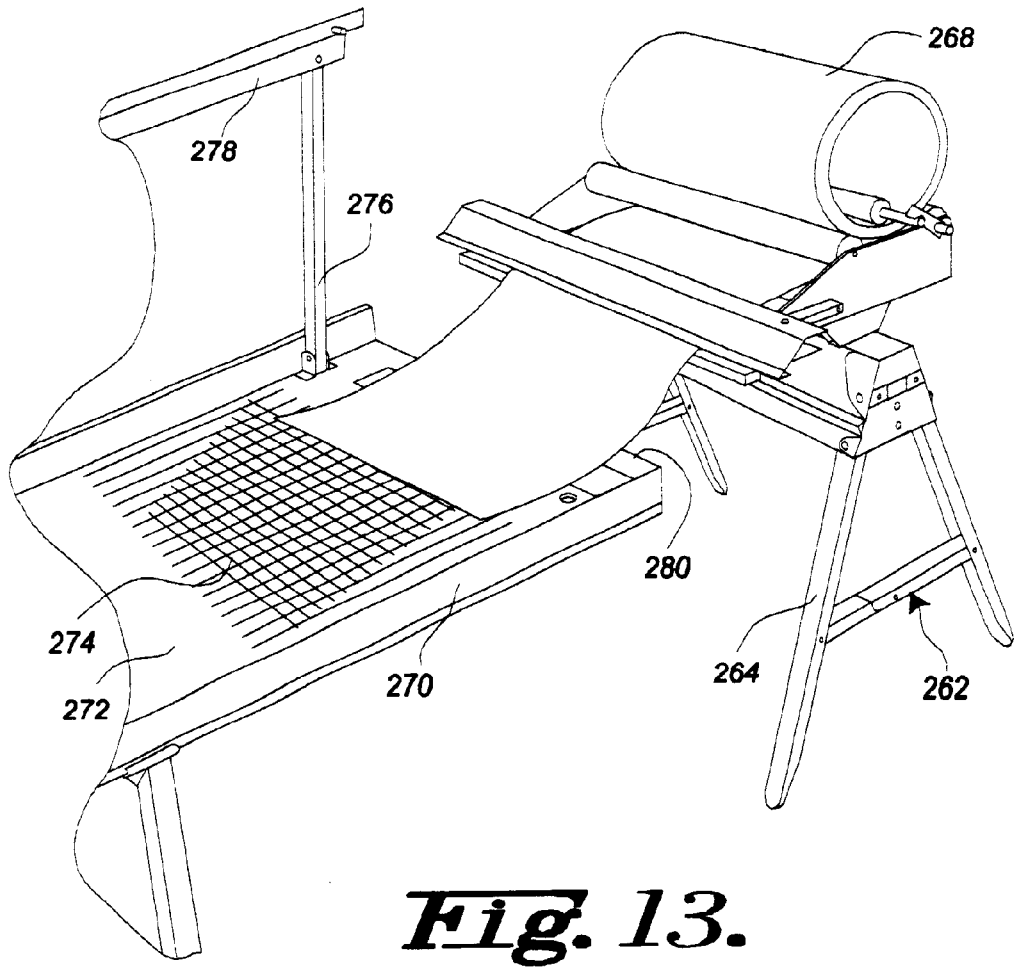
FIG. 13 is a front perspective view of a work table and unattached coil holder.

Referring now to FIG. 13, an alternative embodiment is shown wherein a separate coil dispenser 262 is supported on a saw horse type stand 264. A coil 268 is supported on the coil dispenser 262 as it is dispensed onto the table top 272. The table top 272 includes indicia 274 that may be used to align a workpiece either longitudinally or transversely. The clamping bar 276 supports the longitudinal guide rail 278 and is shown in its raised position. A transverse knife edge 280 is provided on the end of the portable work table 270 and may be used in conjunction with a roller cutter, such as the single knife roller cutter 130 described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable work table for cutting a piece of sheet material to be fabricated comprising:
    a stand;
    a table top supported on the stand, the table top having a front longitudinally extending edge, a rear longitudinally extending edge, a first transversely extending edge and a second transversely extending edge;
    a transversely extending guide rail secured proximate the first transversely extending edge of the table, the guide rail being shifted between a first position wherein the guide rail is spaced above the piece of sheet material on the table and a second position wherein the guide rail is held at a position for clamping the piece of sheet material against the table;
    a longitudinally extending guide rail secured proximate the front longitudinally extending edge of the table top, the longitudinally extending guide rail being shifted between a first position wherein the longitudinally extending guide rail is spaced above the piece of sheet material on the table and a second position wherein the longitudinally extending guide rail is held at a position for clamping the piece of sheet material against the table; and
    a removable cutter having a plurality of rolling elements that support the cutter on either of the guide rails, the cutter having a knife disposed to cut the piece of sheet material supported on the table by coacting with either the front longitudinally extending edge or the first transversely extending edge of the table; wherein the longitudinally extending guide rail and the transversely extending guide rail are independently moveable.

2. The combination of claim 1 wherein a coil holder that is separate from the table is positioned outboard of the first transversely extending edge of the table from which a roll of sheet material may be dispensed onto the table through a space formed between the table and the first transversely extending guide rail, wherein a length of sheet material may be measured with reference to longitudinal measurement indicia on the portable work table and cut off at the first transversely extending edge to form the piece of sheet material.

3. The combination of claim 1, further comprising a rail connected to the longitudinally extending guide rail at the opposite end thereof from the transversely extending guide rail.

4. The combination of claim 3 wherein the transversely extending guide rail, longitudinally extending guide rail, and rail are connected together and pivotally connected to the table proximate a back stop to form a three-sided pivotal frame.

5. The combination of claim 1 wherein the transversely extending guide rail and longitudinally extending guide rail are secured to the table by a plurality of pins to be vertically movable.

6. The combination of claim 5 further comprising at least one spring biasing the guide rails away from the table to provide clearance between the table and the guide rails.

7. The combination of claim 6 further comprising at least one clamp for selectively locking the guide rails in their second position clamping the sheet material against the table.

8. The combination of claim 1 wherein the removable cutter further comprises a carriage and a pair of roller cutter knives disposed to cut the sheet material on the table as the cutter is moved along the transversely extending guide rail.

9. The combination of claim 1 wherein the removable cutter further comprises a carriage and a pair of roller cutter knives disposed to cut the sheet material on the table as the cutter is moved along the transversely extending guide rail and the longitudinally extending guide rail.

10. The combination of claim 1 wherein the removable cutter further comprises a carriage and a roller cutter knife disposed to cut the sheet material on the table top as the cutter is moved along the transversely extending guide rail and the roller cutter knife engages a knife edge on the first transversely extending edge of the table.

11. The combination of claim 1 wherein the removable cutter further comprises a carriage and a roller cutter knife disposed to cut the sheet material on the table as the cutter is moved along the transversely extending guide rail and the longitudinally extending guide rail and the roller cutter knife alternatively engages one of a first knife edge on the first transversely extending edge of the table top and a second knife edge on the longitudinally extending edge of the table top.

12. The combination of claim 1 further comprising a bending flange secured to the longitudinally extending edge of the table by a hinge that is raised to bend a portion of the sheet material overhanging the longitudinally extending edge of the table.

13. The combination of claim 1 wherein a coil holder is connected to the table outboard of the first transversely extending edge of the table from which a roll of sheet material may be dispensed onto the table through a space formed between the table and the first transversely extending guide rail, wherein a length of sheet material may be measured with reference to longitudinal measurement indicia on the portable work table and cut off at the first transversely extending edge to form the piece of sheet material.

14. The combination of claim 13 wherein transverse measurement indicia are provided on the table top for laying out the piece of sheet material for subsequent cutting and bending operations.

15. The combination of claim 13 wherein template information for forming sheet material into complex shapes are provided on the table top to provide instructions for laying out the piece of sheet material for subsequent cutting and bending operations.

16. The combination of claim 1 further comprising a pair of longitudinally extending beams on which the table top is secured, the beams having an upper side having a raised longitudinally extending central portion that is flanked by two relatively lower shoulder portions, the front longitudinally extending edge of the table being received on one shoulder portion.

17. The combination of claim 16 further comprising a first knife edge secured to one of the shoulder portions of one of the longitudinally extending beams adjacent the longitudinally extending edge of the table and a second knife edge secured between two shoulder portions of the two longitudinally extending beams adjacent to the first transversely extending edge of the table top.

18. The combination of claim 16 wherein the beams each include a rib and wherein the stand is detachably secured to the ribs.

* * * * *